US009383785B2

(12) United States Patent
Fan

(10) Patent No.: US 9,383,785 B2
(45) Date of Patent: Jul. 5, 2016

(54) FIXING ELEMENT FOR HARD DISK DRIVE

(71) Applicant: HON HAI PRECISION INDUSTRY CO., LTD., New Taipei (TW)

(72) Inventor: Chih-Hsiang Fan, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 400 days.

(21) Appl. No.: 13/895,369

(22) Filed: May 16, 2013

(65) Prior Publication Data

US 2014/0312197 A1  Oct. 23, 2014

(30) Foreign Application Priority Data

Apr. 18, 2013 (TW) .............................. 102113695 A

(51) Int. Cl.
G12B 9/00 (2006.01)
G06F 1/18 (2006.01)

(52) U.S. Cl.
CPC ...................................... G06F 1/187 (2013.01)

(58) Field of Classification Search
CPC ................................... G06F 1/16; G06F 1/187
USPC .................. 248/27.1, 27.3, 560; 361/679.31, 361/679.33, 679.34, 679.35, 679.36, 679.37
See application file for complete search history.

(56) References Cited

U.S. PATENT DOCUMENTS

| | | | | |
|---|---|---|---|---|
| 5,654,873 A * | 8/1997 | Smithson | ................ | G06F 1/181 361/679.37 |
| 5,767,999 A * | 6/1998 | Kayner | ................ | G06F 13/409 398/164 |
| 6,215,666 B1 * | 4/2001 | Hileman | .............. | G11B 33/124 361/679.32 |
| 6,351,394 B1 * | 2/2002 | Cunningham | ....... | G02B 6/4277 174/375 |
| 6,454,580 B1 * | 9/2002 | Hwang | ................ | G02B 6/4277 398/164 |
| 7,593,221 B2 * | 9/2009 | Sheng | ................ | G11B 33/1493 361/679.35 |
| 2007/0014086 A1 * | 1/2007 | Kim | ....................... | G06F 1/187 361/679.36 |
| 2007/0223189 A1 * | 9/2007 | Chiang | ................ | G11B 33/128 361/679.33 |
| 2008/0013272 A1 * | 1/2008 | Bailey | ..................... | G06F 1/187 361/679.33 |
| 2008/0316698 A1 * | 12/2008 | Yeh | ........................ | G11B 33/08 361/679.33 |
| 2010/0149746 A1 * | 6/2010 | Crippen | .............. | G11B 33/122 361/679.33 |

FOREIGN PATENT DOCUMENTS

| | | |
|---|---|---|
| CN | 2816984 Y | 9/2006 |
| CN | 101312066 A | 11/2008 |
| CN | 201307418 Y | 9/2009 |
| CN | 101634881 A | 1/2010 |
| CN | 202307142 U | 7/2012 |

* cited by examiner

Primary Examiner — Kimberly Wood
(74) Attorney, Agent, or Firm — Novak Druce Connolly Bove + Quigg LLP

(57) ABSTRACT

A fixing element for hard disk drive includes a frame and a hard disk. The frame includes a bottom plate, a front plate, a rear plate and a side plate. The front plate has a flange extending horizontally and backwardly from the front plate. A first elastic element is formed on a bottom of the flange. A second elastic element is located at the bottom plate in a position directly under the first elastic element. The supporting element defines an engaging groove at rear ends thereof. The engaging groove engages with a position element secured to the frame, the first elastic element is abutting an upper surface of the supporting element, and the second elastic element is abutting a bottom surface of the supporting element.

16 Claims, 8 Drawing Sheets

FIXING ELEMENT FOR HARD DISK DRIVE

BACKGROUND

1. Technical Field

The present disclosure relates to a fixing element for hard disk drive, and especially relates to a fixing element for hard disk drive which can reduce the affect of vibration to the hard disk drive.

2. Description of Related Art

A hard disk drive is generally fixed to a frame through screws. However, the vibration of the frame is easy to transmit to the hard disk drive by the screw. In operation of the hard disk drive, the vibration is easy to cause the hard disk drive to lost data or even damage.

What is needed, therefore, is a fixing element for hard disk drive which can overcome the above-described problems.

BRIEF DESCRIPTION OF THE DRAWINGS

Many aspects of the present method and fan can be better understood with reference to the following drawings. The components in the drawings are not necessarily drawn to scale, the emphasis instead being placed upon clearly illustrating the principles of the present method and fan. Moreover, in the drawings, like reference numerals designate corresponding parts throughout the several views.

DETAILED DESCRIPTION

Figure 1:
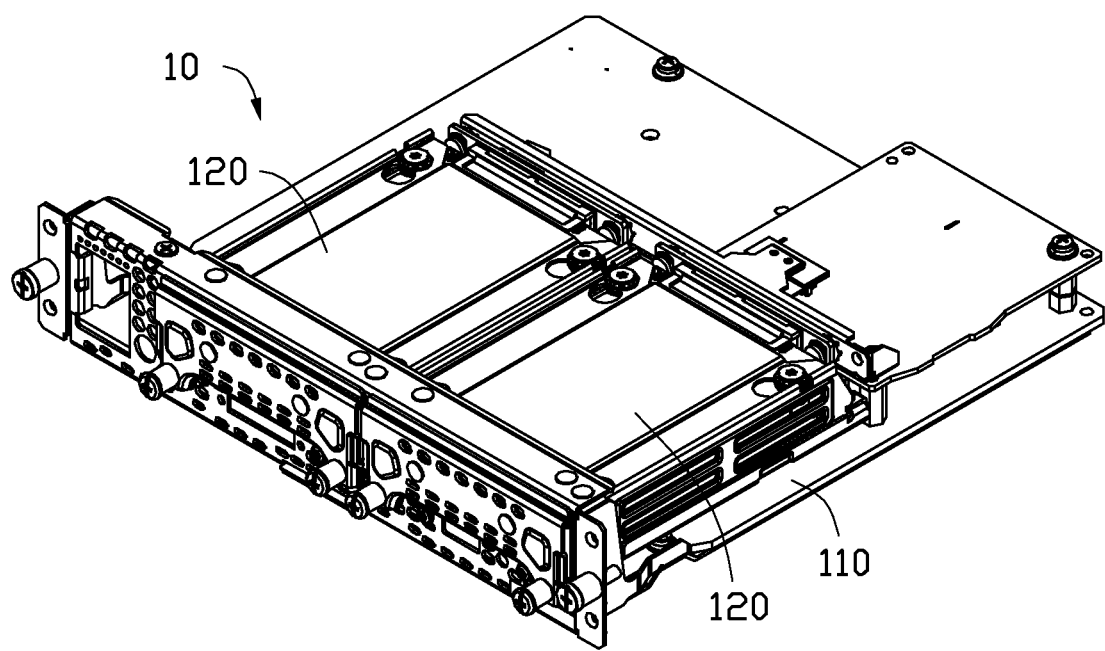
FIG. 1 is an assembled, isometric view of a fixing element for hard disk drive in accordance with an embodiment of the disclosure.
Figure 2:
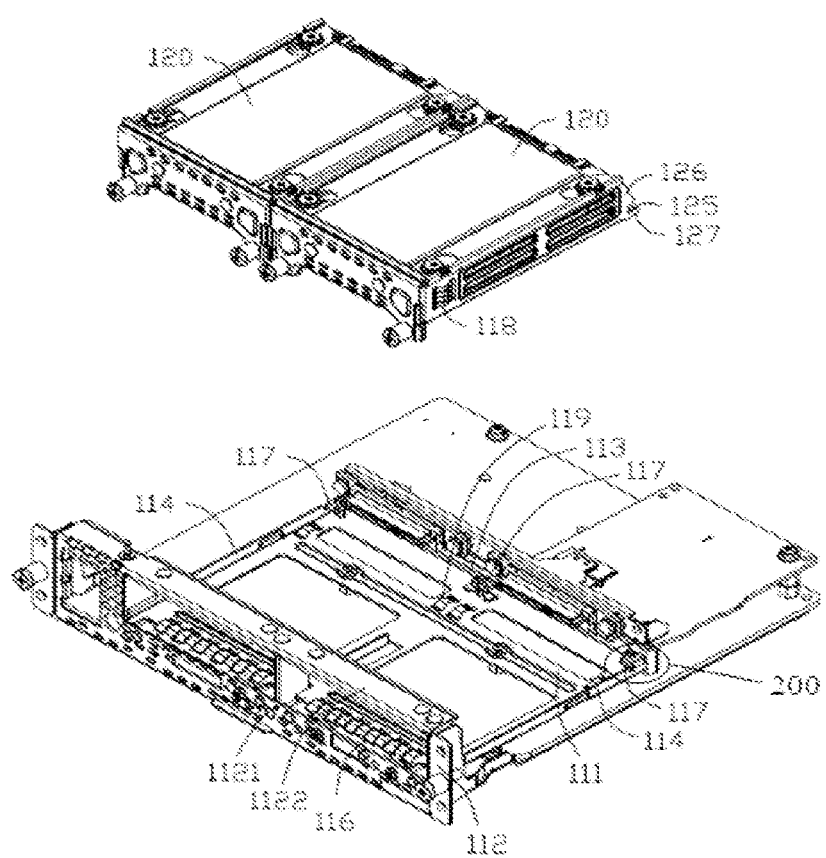
FIG. 2 is an exploded view of the fixing element in FIG. 1.
Figure 3:
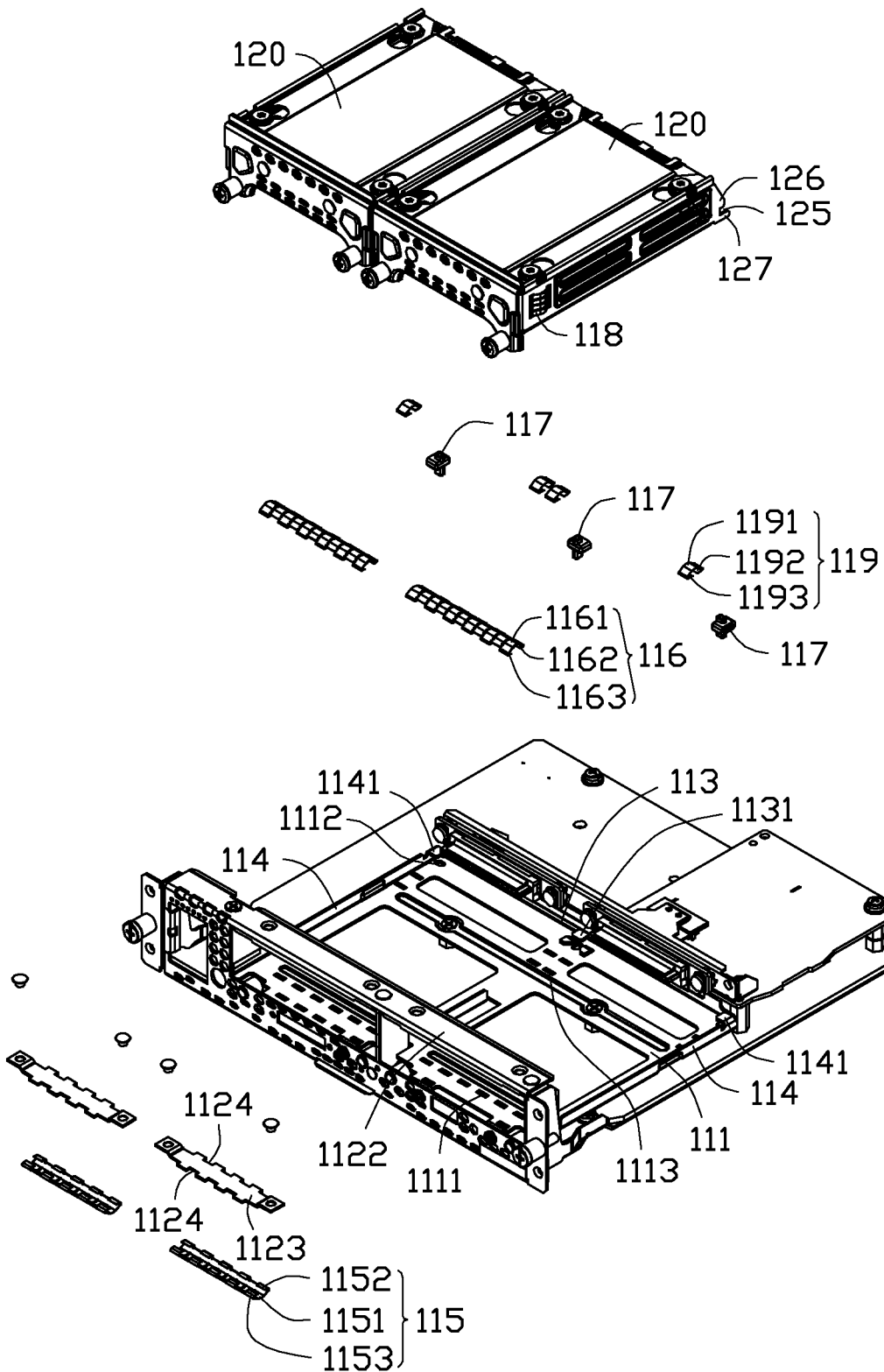
FIG. 3 is a further exploded view of the fixing element in FIG. 1.

Referring to FIGS. 1-3, a fixing element 10 in accordance with an embodiment of the disclosure is provided for hard disk drive. The fixing element 10 includes a frame 110, and a supporting element 120 fixing on the frame 110 for supporting a hard disk drive.

The fame 110 includes a bottom plate 111, a front plate 112, a rear plate 113, and a side plate 114 extending upwardly from the bottom plate 111. The side plate 114 is connected between the front plate 112 and the rear plate 113.

Figure 4:
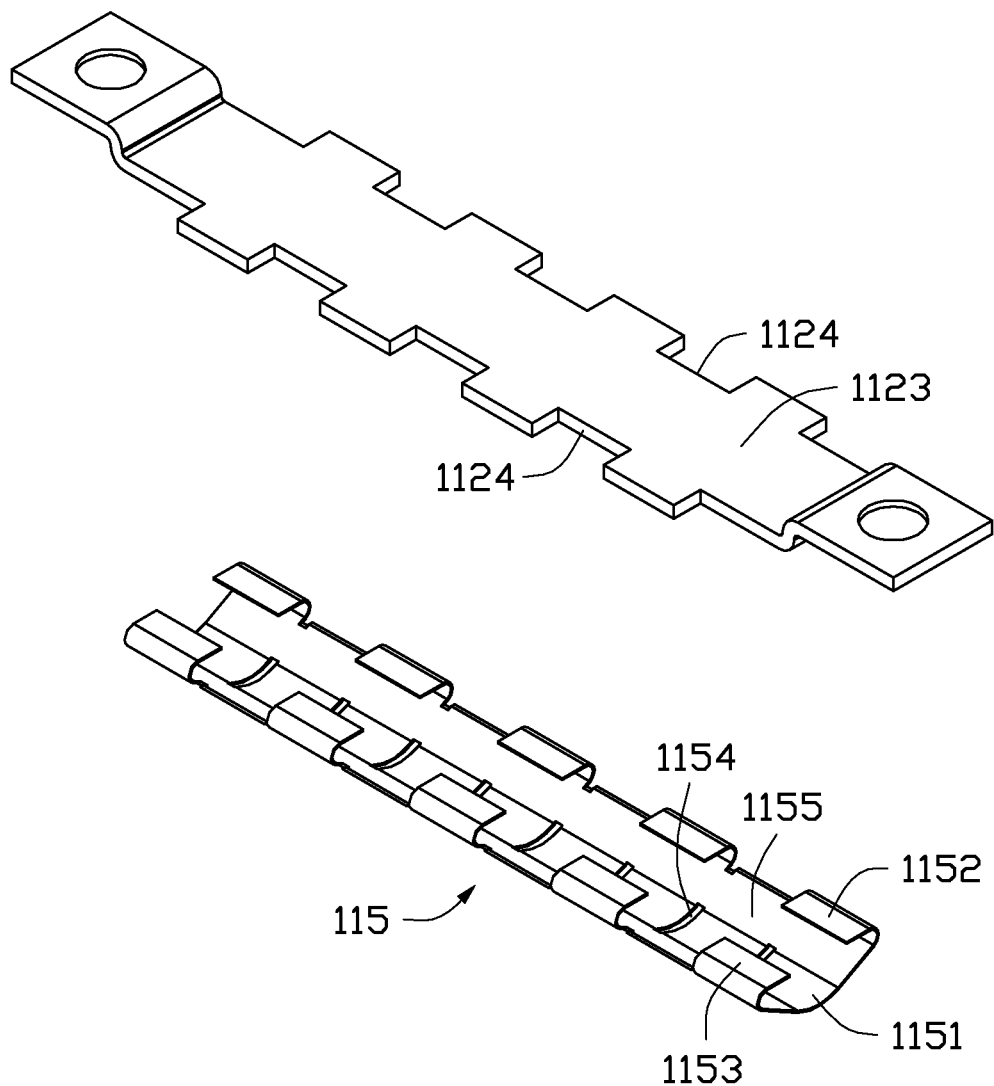
FIG. 4 is an enlarge view of a first elastic element of the fixing element in FIG. 3.

The front plate 112 defines an opening 1121. The supporting element 120 is inserted into the frame 110 from the opening 1121. A flange 1122 extends horizontally from an upper portion of the front plate 112. A first elastic element 115 is fixed to a bottom of the flange 1122. The first elastic element 115 is made of metal materials such as copper, aluminum, and stainless steel. Referring also to FIG. 4, the first elastic element 115 includes a central portion 1151, two latching portions 1152, 1153 extending inwardly from the central portion 1151. In this embodiment, the central portion 1151 is concave. The central portion 1151 defines a plurality of spacing grooves 1154. The spacing grooves 1154 are arranged in a longitudinal direction of the first elastic element 115, and each of the spacing grooves 1154 is vertical to the longitudinal direction of the first elastic element 115. Each of the spacing grooves 1154 does not extend out of the central portion 1151, thereby forming two connecting portions 1155 located at two sides of the spacing grooves 1154 respectively. The connecting portions 1155 connect two adjacent parts of the central portion 1151 separated by the spacing groove 1154. The spacing grooves 1154 are configured for adjusting an elastic force of the first elastic element 115. Preferably, the spacing grooves 1154 are arranged in the central portion 1151 with a constant interval. A fixing plate 1123 is formed on the bottom of the flange 1122. The fixing plate 1123 defines a plurality of first receiving grooves 1124 in a position corresponding to the latching portions 1152, 1153 of the first elastic element 115. The latching portions 1152, 1153 of the first elastic element 115 are engaged in the first receiving grooves 1124 of the fixing plate 1123 to retain the first elastic element 115 with the fixing plate 1123. In an alternative embodiment, the first receiving grooves 1124 can be directly defined in the flange 1122 to fix the first elastic element 115 to the flange 1122.

Figure 5:
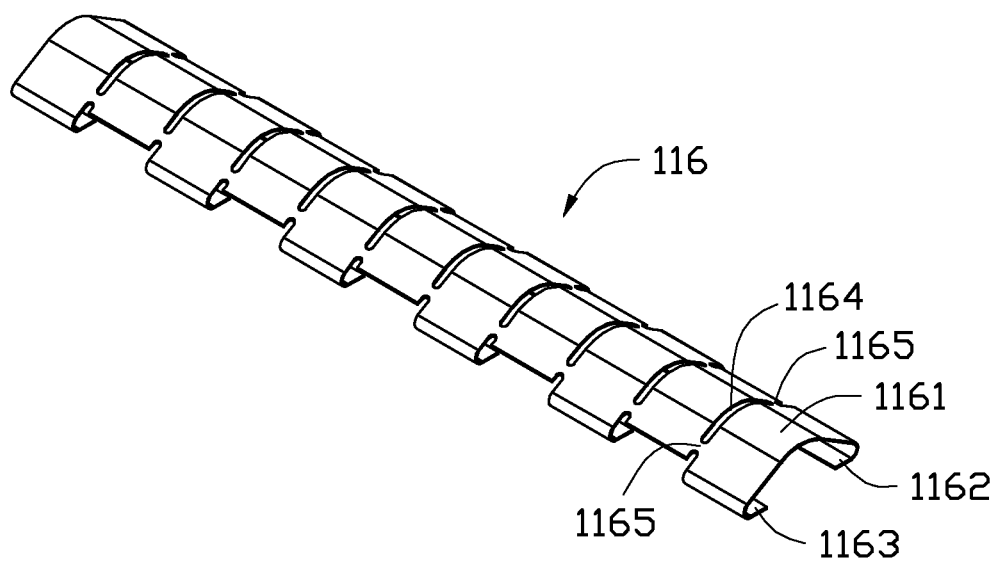
FIG. 5 is an enlarge view of a second elastic element of the fixing element in FIG. 3.

A second elastic element 116 is formed on the bottom plate 111 in a position corresponding to the first elastic element 115. The second elastic element 116 is fixed to the bottom plate 111 and located directly under the first elastic element 115. Referring also to FIG. 5, the second elastic element 116 includes a central portion 1161 and two latching portions 1162, 1163 extending inwardly from the central portion 1161. The central portion 1161 is concave. The central portion 1161 defines a plurality of spacing grooves 1164. The spacing grooves 1164 are arranged in a longitudinal direction of the second elastic element 116, and each of the spacing grooves 1164 is parallel to the longitudinal direction of the second elastic element 116. Each of the spacing grooves 1164 does not extend out of the central portion 1161, thereby forming two connecting portions 1165 located at two sides of the spacing grooves 1164 respectively. The connecting portions 1165 connect two adjacent parts of the central portion 1161 separated by the spacing groove 1164. The spacing grooves 1164 are configured for adjusting an elastic force of the second elastic element 116. The bottom plate 111 defines a plurality of second receiving grooves 1111 in a position corresponding to the latching portions 1162, 1163 of the second elastic element 116. The latching portions 1162, 1163 of the second elastic element 116 are engaged in the second receiving grooves 1111 of the bottom plate 111 to retain the second elastic element 116 with the bottom plate 111.

Figure 6:
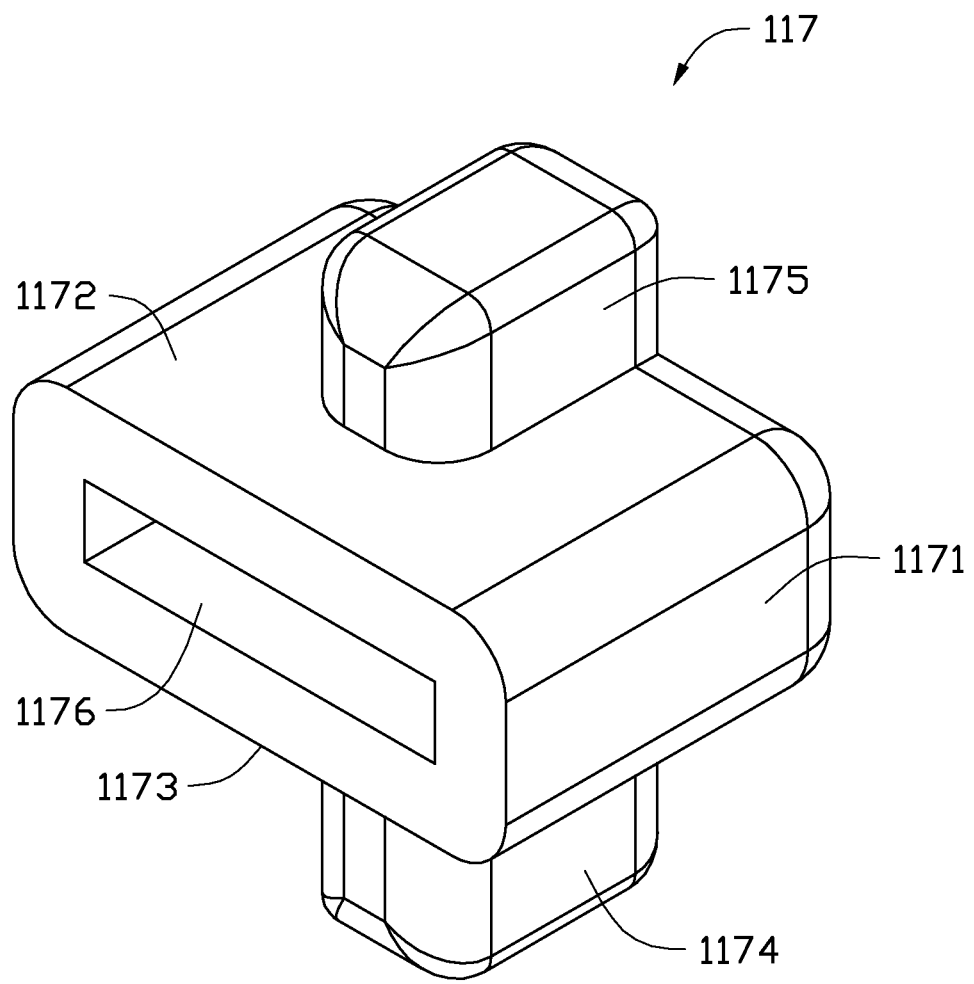
FIG. 6 is an enlarge view of a position element of the fixing element in FIG. 3.

A first protrusion 1141 extends horizontally from an upper end of the side plate 114. The first protrusion 1141 is located in a position adjacent to the rear plate 113. A position element 117 is inserted into the first protrusion 1141. The position element 117 is made of elastic materials such as rubber. Referring also to FIG. 6, the position element 117 includes a main body 1171. The main body 1171 includes an upper surface 1172 and a bottom surface 1173. A first supporting portion 1174 extends downwardly from the bottom surface 1173 of the main body 1171. A second supporting portion 1175 extends upwardly from the upper surface 1172 of the main body 1171. The main body 1171 defines an inserting groove 1176. The first protrusion 1141 is inserted into the inserting groove 1176 to secure the position element to the frame 110. Preferably, the bottom plate 111 defines a through hole 1112 corresponding to the first protrusion 1141. When the first protrusion 1141 is inserted into the inserting groove 1176 of the main body 1171, the first supporting portion 1174 will extend through the through hole 1112. That is, the position element 117 is not easy to be broken away from the first protrusion 1141.

Figure 7:
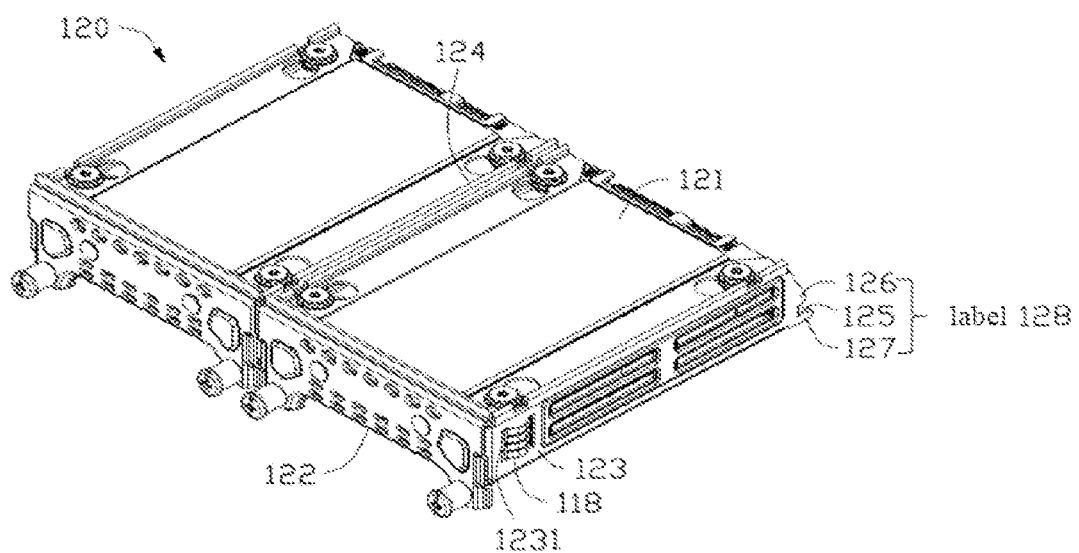
FIG. 7 is an enlarge view of a supporting element of the fixing element in FIG. 3.
Figure 8:
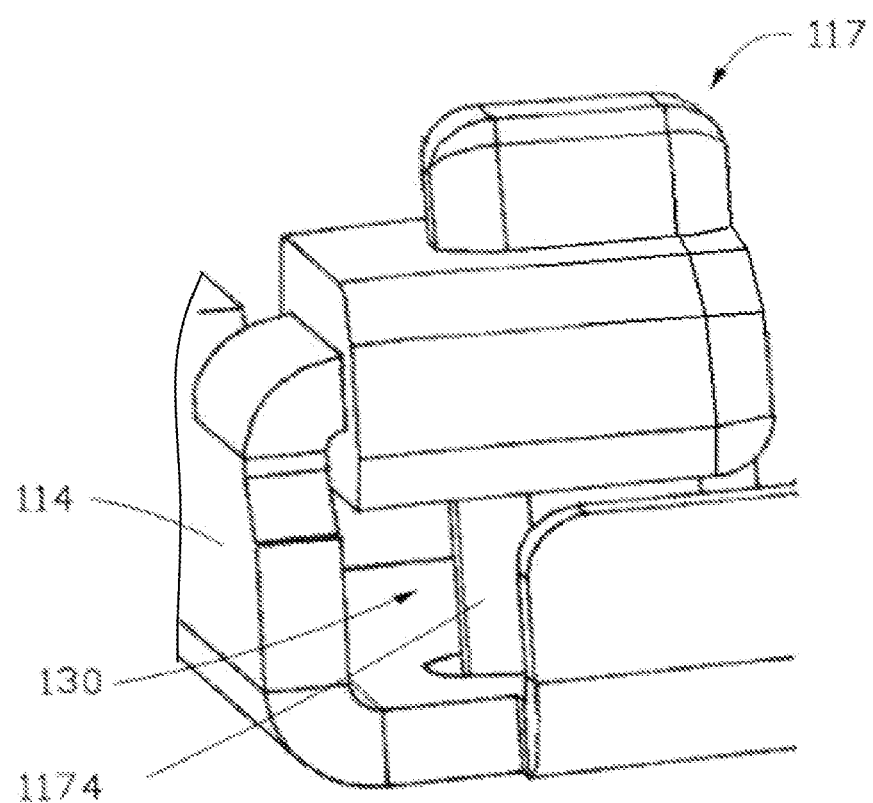
FIG. 8 is an enlarge view of a position element engaged to a side plate in FIG. 2.

Referring to FIG. 7 and FIG. 8, the supporting element 120 has an upper surface 121, a bottom surface 122, a left side surface 123 and a right side surface 124. The left side surface 123 and the right side surface 124 are adjacent to the side plate 114. Rear ends of the left side surface 123 and the right side surface 124 each form an engaging part 128. The supporting element 120 for receiving a hard disk drive (not shown) therein. When the supporting element 120 is assembled to the frame 110, the engaging part 128 is engaged with the position element 117. The engaging part 128 includes an engaging groove 125 engaging the position element 117 therein, an upper portion 126 and a bottom portion 127 located at two opposite sides of the engaging groove 125. The upper portion 126 contacts the upper surface 1172 of the position element 117. The bottom portion 127 contacts the bottom surface 1173 of the position element 117. Preferably, the first supporting portion 1174 of the position element 117 and the side plate 114 defines a gap 130 therebetween. When the engaging part 128 is engaged to the position element 117, the bottom portion 127 of the engaging part passes through the gap 130 between the first supporting portion 1174 and the side plate 114, thereby making the supporting element 120 not easy to move in a direction of right or left.

In assembling, the supporting element 120 is inserted into the frame 110 from the opening 1121 of the front plate 112, until the engaging groove 125 of the supporting element 120 is engaged with the position element 117. At that time, the first elastic element 115 is abutting the upper surface 121 of the supporting element 120. The second elastic element 116 is abutting the bottom surface 122 of the supporting element 120. When the frame 110 is vibrating, the first elastic element 115 and the second elastic element 116 will deform to absorb part of energy of the vibration. Therefore, effect of the vibration to the hard disk drive in the supporting element 120 decreases.

Preferably, the third elastic elements 118 are formed on the left side surface 123 and the right side surface 124 of the supporting element 120. When the supporting element 120 is assembled to the frame 110, the third elastic element 118 is abutting the side plate 114 of the frame 110. The third elastic element 118 is made of metal materials such as copper, aluminum and stainless steel. The supporting element 120 defines a third receiving groove 1231. The third elastic element 118 is engaged with the third receiving groove 1231 to secure the third elastic element 118 to the supporting element 120. Since the third elastic element 118 is formed on the left side surface 123 and the right side surface 124 of the supporting element 120, when the frame 110 is vibrating from left side to right side or from right side to left side, the third elastic element 118 will deform to absorb part of energy of the vibration.

Preferably, a second protrusion 1131 is further formed at the rear plate 113 of the frame 110. The second protrusion 1131 extends horizontally from an upper end of the rear plate 113. Another position element 117 is located at the second protrusion 1131 to engage with the engaging groove 125 of the supporting element 120.

The frame 110 further includes a fourth elastic element 119. The fourth elastic element 119 is located at the bottom plate 111 in a position adjacent to the rear plate 113. The fourth elastic element 119 includes a main body 1191 and two latching portions 1192, 1193 extending inwardly from the main body 1191. The bottom plate 111 defines a plurality of fourth receiving grooves 1113 in a position corresponding to the latching portions 1192, 1193 of the fourth elastic element 119. The latching portions 1192, 1193 of the fourth elastic element 119 are engaged with the fourth receiving grooves 1113 of the bottom plate 111 to connect the fourth elastic element 119 with the bottom plate 111. When the supporting element 120 is inserted into the frame 110, the fourth elastic element is abutting the bottom surface 122 of the supporting element 120.

It is to be understood, however, that even though numerous characteristics and advantages of various embodiments have been set forth in the foregoing description, together with details of the structures and functions of the embodiments, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A fixing element for hard disk drive, comprising:
   a frame, comprising a bottom plate, a front plate, a rear plate, and a side plate extending upwardly from the bottom plate, the side plate being connected between the front plate and the rear plate, the front plate having a flange extending horizontally and backwardly from the front plate;
   a position element, secured to the frame in a position adjacent to the rear plate;
   a first elastic element, formed on a bottom of the flange;
   a second elastic element, located at the bottom plate in a position directly under the first elastic element; and
   a supporting element for supporting hard disk drive, and defining an engaging groove at rear ends thereof, the engaging groove engaging with the position element, the first elastic element being abutting an upper surface of the supporting element, and the second elastic element being abutting a bottom surface of the supporting element; wherein a first protrusion extends inwardly from an upper end of the side plate, an inserting groove is defined in the position element, and the first protrusion is inserted into the inserting groove to secure the position element to the frame.

2. The fixing element of claim 1, wherein the position element comprises a main body, a first supporting portion and a second supporting portion, the inserting groove is defined in the main body of the position element, a first supporting portion extends downwardly from a bottom surface of the main body, and a second supporting portion extends upwardly from an upper surface of the main body.

3. The fixing element of claim 2, wherein the bottom plate defines a through hole in position corresponding to the first protrusion, when the first protrusion is inserted into the inserting groove of the position element, the first supporting portion extends downwardly through the through hole.

4. The fixing element of claim 3, wherein a second protrusion extends inwardly from an upper end of the rear plate, the second protrusion is inserted into another position element to be engaged with the engaging groove of the supporting element.

5. The fixing element of claim 1, wherein the first elastic element and the second elastic element are made of metallic materials.

6. The fixing element of claim 5, wherein the first elastic element comprises a main body and two latching portions extending inwardly from the main body, a fixing plate is secured to the flange of the front plate, the fixing plate defines a plurality of first receiving grooves thereon, and the latching portions of the first elastic element are engaged with the first receiving grooves to secure the first elastic element to the flange.

7. The fixing element of claim 6, wherein the main body of the first elastic element is concave.

8. The fixing element of claim 7, wherein the main body of the first elastic element defines a plurality of spacing grooves arranged in a longitudinal direction of the main body, and each of the spacing grooves extends in a direction vertical to the longitudinal direction of the main body.

9. The fixing element of claim 8, wherein the spacing grooves are defined within the main body of the first elastic element, two connecting portions are formed at two sides of each of the spacing grooves, and the connecting portions connect the two adjacent portions of the main body of the first elastic element separated by the spacing groove.

10. The fixing element of claim 5, wherein the second elastic element comprises a main body and two latching portions extending inwardly from the main body of the second elastic element, the bottom plate defines a plurality of second receiving grooves, and the latching portions of the second elastic element are engaged with the second receiving grooves to secure the second elastic element to the bottom plate.

11. The fixing element of claim 10, wherein the main body of the second elastic element is concave.

12. The fixing element of claim 11, wherein the main body of the second elastic element defines a plurality of spacing grooves arranged in an elongate direction of the main body of the second elastic element, and each of the spacing grooves extends in a direction vertical to the elongate direction of the main body of the second elastic element.

13. The fixing element of claim 12, wherein the spacing grooves are defined within the main body of the second elastic element, two connecting portions are formed at two sides of each of the spacing grooves, and the connecting portions connect the two adjacent portions of the main body of the second elastic element separated by the spacing groove.

14. The fixing element of claim 1, wherein two third elastic elements are formed on a left side surface and a right side surface of the supporting element respectively, and the third elastic element is abutting the side plate of the frame.

15. The fixing element of claim 1, wherein the third elastic element is made of metallic materials.

16. The fixing element of claim 15, wherein the third elastic element comprises a main body and two latching portions extending inwardly from the main body of the third elastic element, the supporting element defines a plurality of third receiving grooves, and the latching portions of the third elastic element are engaged with the third receiving grooves to secure the third elastic element to the supporting element.

* * * * *